Patented May 23, 1944

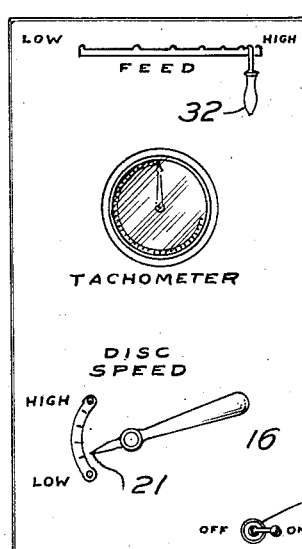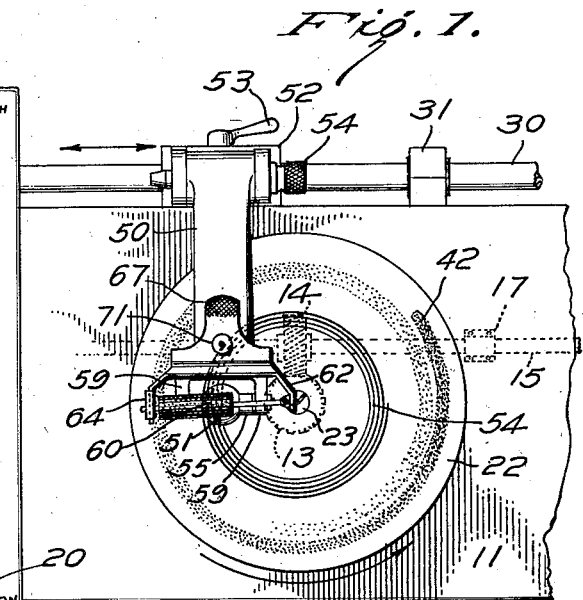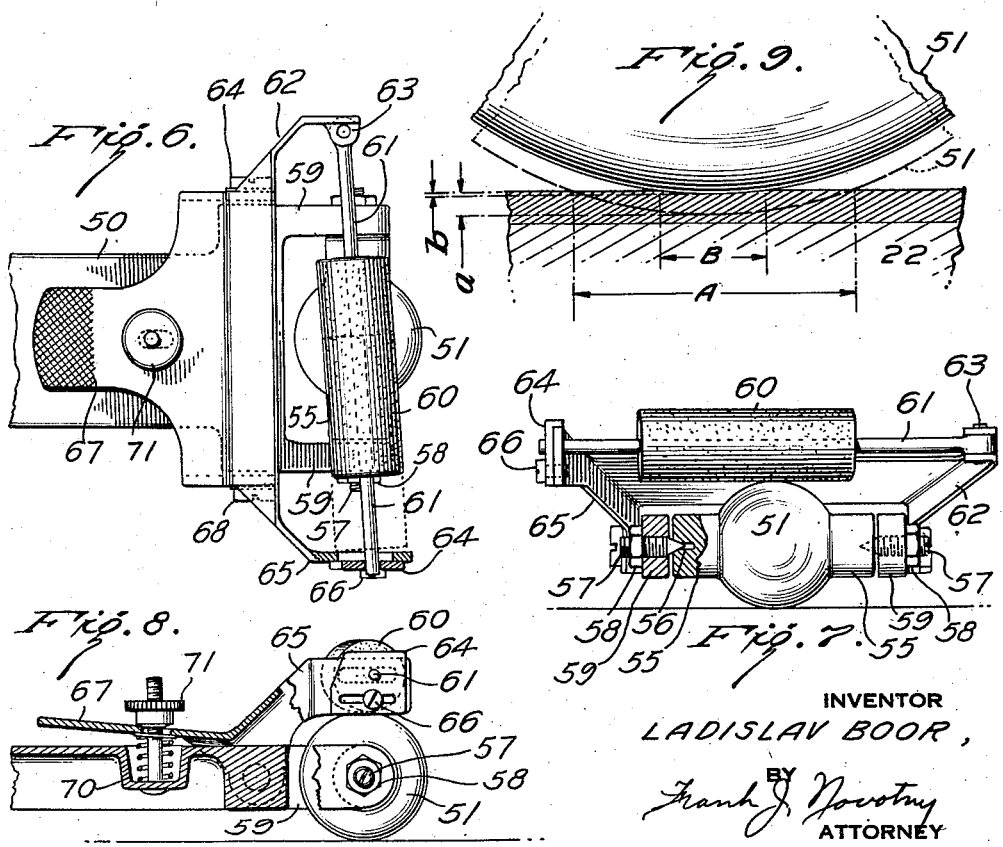

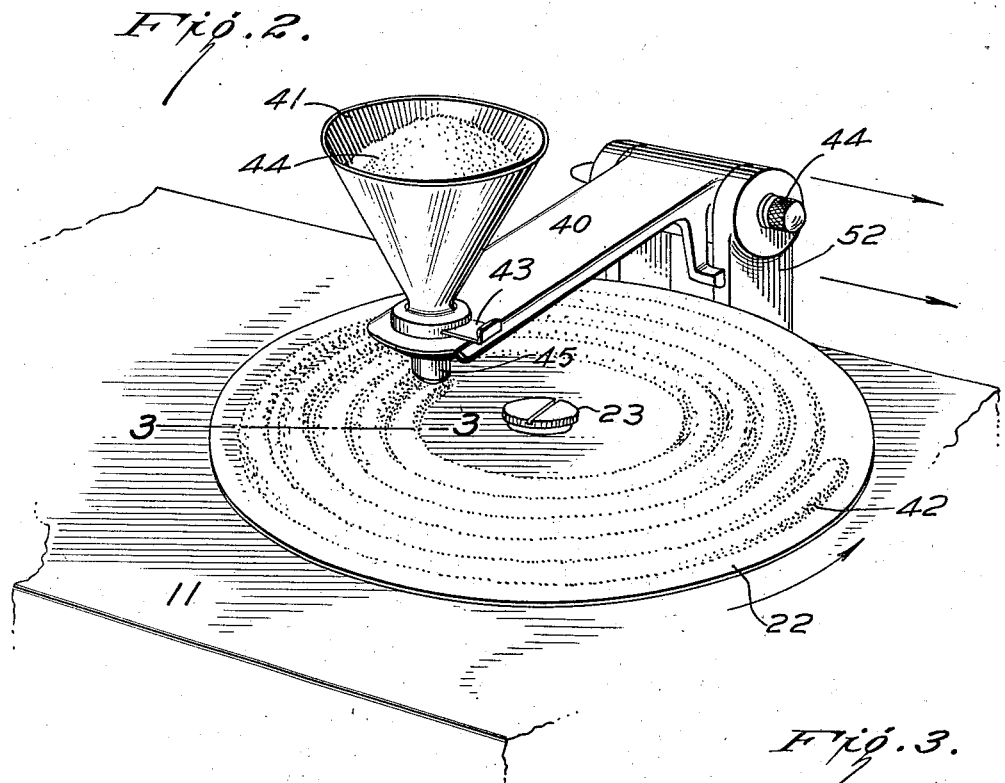
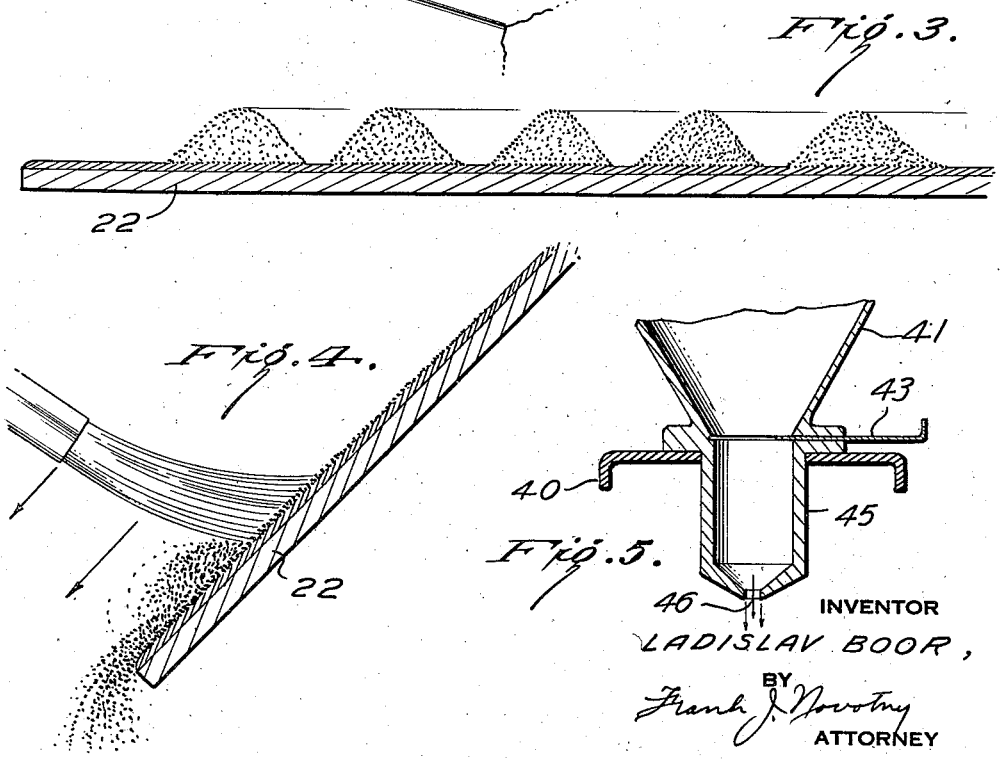

2,349,699

UNITED STATES PATENT OFFICE 2,349,699

APPARATUS AND METHOD FOR TESTING PAINT FILMS

Ladislav Boor, Darien, Conn., assignor to American Cyanamid Company, New York, N. Y., a corporation of Maine Application September 25, 1942, Serial No. 459,623

5 Claims. (Cl. 73—51)

This invention relates to a method and apparatus for measuring the drying and hardening properties of paint films.

More particularly it includes apparatus wherein a weighted steel ball is used to trace a continuous line on a paint film using non-drying colored ink, the width of the continuous line being subsequently used to measure the hardening rate of the paint film.

Heretofore it has been exceedingly difficult to measure the indentation caused by a given load on thin films such as those obtained from a coat of paint because of the tendency of the film to recover its original shape after the load is removed. Moreover with previous apparatus it has been impossible to obtain a continuous reading of the hardening properties of a film. The usual commercial hardness testers require an operator to be in constant attendance and to make each test manually. This usually necessitates practically continuous observation on the part of the operator.

It is an object of this invention to obviate these defects in the prior art. A further object is to provide apparatus which lends itself to continuous unattended recording. Still another object is to provide a permanent record of the hardening rate of various paint, lacquer, and similar films. Still other objects will become apparent upon reading the following description of one embodiment of the invention.

In attaining these objects in accordance with the method and apparatus disclosed herein, it has been found that by using a spherical indenter in the form of a steel ball about one inch in diameter, and by applying to this ball a very thin film of a non-drying pigmented ink, that the imprint of the ball is left on the soft paint film and the width of the imprinted record can be measured at any time thereafter—whether the film recovers from the indentation or not. This permanent record shows a progressively smaller width of indentation in the film as the film hardens or is subjected to further baking steps.

Although paint films may be prepared for testing in accordance with the process herein disclosed by any one of a number of methods, such as brushing, spraying, dipping, etc., it has been found convenient to prepare the film for testing by spinning it on a flat circular disc. For this purpose, circular discs of saw steel about eight inches in diameter, ground flat and true on both sides, provide an ideal rigid substrate for the test films.

In the drawings forming a part of this description,

Fig. 1 is a top plan view of a working embodiment of apparatus, a portion of which is broken away, showing one disc in place;

Fig. 2 is a perspective view of a sand depositing device for drying time determination in position on the apparatus of Fig. 1;

Fig. 3 is a view showing the spirally displaced sand rings in cross section extending over one-half of a paint film, the figure being taken on the line 3—3 of Fig. 2;

Fig. 4 shows a method of removing the loosely adherent sand grains from the paint film by means of a camel's hair brush;

Fig. 5 is a vertical sectional view showing the construction of the sand feeding funnel;

Fig. 6 is a top plan view of the recording end of the ball indenter shown in Fig. 1;

Fig. 7 is a view of the ball indenter as seen from the right side of Fig. 6, showing the ball in contact with the paint film and with the inking roller in position for transferring ink to the ball;

Fig. 8 is a side elevation of the ball indenter shown in Fig. 6 with portions broken away in order to illustrate the cooperation of the various parts more clearly; and Fig. 9 shows a portion of the ball itself in contact with a soft paint film (broken lines) and in contact with a relatively more hardened paint film (full lines).

Referring now more particularly to the drawings, Fig. 1 illustrates a table, the top 11 of which has journaled therein a vertical turntable shaft to which is affixed a driven gear 13 which is positioned below the surface 11 of the table. Gear 13 is in turn driven by gear 14 affixed to shaft 15 which is journaled in speed reducing box 16 as well as at other points along the underside of the table 11, such as 17.

Switch 20 is used to start the motor (not shown). By means of lever 21 speeds varying from one revolution per four hour interval, one revolution per hour, and higher, including such high speeds as are necessary for spinning a uniform paint film on a disc, may be imparted to the disc 22 affixed to the turntable shaft by the hub fastening screw 23. Such variable speeds are obtained by the use of conventional speed reduction gears which are familiar to those versed in the related art. These gear reduction devices are all contained in box 16.

In order to carry out continuous tests on the various paint films, a shaft 30, journaled at 31 as well as within the speed reducing box 16, is provided. Various testing arms such as 40, Fig. 2, for carrying a testing arm 50, Fig. 1, for carrying a ball hardness tester 51, are adjustably capable of being affixed by a rigid link member 52 to shaft 30 by a tensioning lug 53. Shaft 30 is adapted to be operated by the gear train by merely shifting lever 32 in such a manner as to carry the sand funnel 41 across the face of the disc 22 with a pitch of ½" for each revolution of disc 22 in order to make distinct sand tracks 42, and by shifting control lever 32 to the left still further shaft 30 can be made to carry the ball hardness tester 51 affixed to the shaft 30 across the face of the disc 22 with a pitch of $\frac{1}{16}$" in order to make distinct indentation tracks 54 on the paint film.

As shown in Figs. 6, 7 and 8, indenting ball 51 is fitted with lugs 55 which have drilled ends 56 into which are fitted screws 57, the latter serving as bearings. Bearing screws 57 are securely locked in place by retaining nuts 58. The whole ball indenting unit is mounted at the end of lever arms 59 which form a part of testing arm 50.

In order to make a more permanent record, an inking device is provided for the ball 51 so that the imprint of the ball on the paint film is left in the form of a permanent line of varying thickness which can be measured at any time, whether the paint film recovers from the impression of the ball or not. The continuous inking roller 60 is mounted to rotate and slide laterally on the shaft 61. The shaft 61 is offset about 2° from the axis of ball 51 so that the ball in turning and while contacting the inking roller 60 imparts a slight lateral motion to the inking roller, thereby utilizing the entire inking surface of roller 60.

The inking roller shaft 61 is fulcrumed on one of the lever arms 62 by means of pivot member 63, while the other end of the shaft 61 is adapted to slide in a loosely fitting journal cut in offset segment 64 which is fixedly positioned contiguous to lever arm 65 by means of screw bolt 66. Lever arms 62 and 65 form a yoke having a leg portion 67, the whole being fulcrumed on the testing arm 50 by screw bolts 68 and 69. The inking roller is held in contact with the indenting ball 51 by spring 70. The inking roller may be lifted off ball 51 by tightening thumb screw 71.

In order to set the apparatus in condition for operation the discs 22 are coated with a test paint film by spinning the film on the discs. The arms 50 are removed and the discs are rotated at a relatively high speed by shifting lever 21 to a pre-selected position. Then an excess of paint (about 20 gm.) is poured in a continuous stream onto the rotating disc at a point about ¼ of an inch from the hub. The machine is stopped after a predetermined spinning interval sufficient to give a uniformly dispersed paint film. The test films may also be applied by any of the other methods described previously.

The machine is then set up so as to rotate disc 22 at a rate of one revolution per hour (or slower if a very slowly drying film is on the disc). Control lever 32 is set to move shaft 30 ½ inch for each revolution of disc 22. Slide valve 43, Fig. 5, at the base of the sand funnel 41 is then closed and the funnel filled with sand 44. Arm 40 is put in position on link 52 by means of pin 44 and link 52 is locked so as to allow the funnel to spread sand near the edge of disc 22. Then funnel 41 is positioned in the arm 40 and slide valve 43 opened to allow the sand to fall through neck 45 and opening 46, the latter being about $\frac{1}{16}$" above the surface of the revolving paint film.

The drying time of the coating material is determined by allowing the machine to drop sand on the rotating coated disc for a definite time interval. The disc is then removed with sand piled spirally thereon as shown in Fig. 3. The excess sand is then removed by gently tapping the disc. The remaining sand gives an indication of the time interval necessary to allow the paint film to become tack-free. By removing the loosely adhering sand with a camel's hair brush as shown in Fig. 4, the time interval necessary for the paint film to become set to touch can be determined.

In order to obtain a continuous record of indentation hardness of the film, the steel ball is inked with a non-drying ink formulation, roller 60 is positioned as shown by the dotted lines of Fig. 6, control handle 32 is set so that shaft 30 is moved laterally $\frac{1}{16}$ of an inch for each revolution of disc 22 and link 52 is positioned along shaft 30 so that ball 51 is located somewhere within the innermost extension of the sand spirals, whereupon link 52 is fastened to shaft 30 by tightening fastening bolt 53. The speed lever 21 is then set to operate the disc at a speed of one revolution per hour or one revolution per four hour interval, depending on the speed of hardening of the film.

Since in indentation hardness tests, the ratio of load to the area of a spherical surface of indentation is usually taken as a measure of hardness, this same ratio is taken for purposes of comparison of the hardness of paint films. For purposes of this invention each arm is calibrated by means of a pan balance and adajusted to give a load of 265 g.±2½ g. on the ball 51. In this specific apparatus the tested films are only 1 to 2 thousandths of an inch thick, hence the amount of vertical indentation is extremely small and the projected area of the spherical indentation is, for all practical purposes, the same as the surface area of the indentation. Therefore one dimension only, namely the width of the path made by rolling ball 51, is sufficient to determine the projected area of indentation. Such a hardness formula reduces to the following:

$$\text{Hardness} = \frac{L}{W^2} \times 10^{-2}$$

when

L = load in grams

W = width in millimeters $10^{-2}$ is used to bring the figures obtained within a more convenient numerical range by avoiding large values for the harder paint films.

Figure 9 shows the geometrical relationship between width of path and depth of indentation on a greatly enlarged scale. For a 1" ball these values have the following relations:

| Width of path | | Depth of indentation |
| --- | --- | --- |
| Mm. | Inches | Inches |
| .10 | .004 | .00001 |
| .51 | .020 | .00010 |
| 1.02 | .040 | .00040 |
| 1.53 | .060 | .00090 |
| 2.03 | .080 | .00150 |

Thus for all practical purposes, the vertical indentation is extremely small and may be neglected altogether in computation of areas. The continuous record of the rate at which the film hardens after first obtaining the film in a tack-free condition is thus readily obtainable by measuring the width of the ink track made by the inked ball 51 moving at a controlled rate over the rotating paint film coated on a disc such as 22. As a result, a spiral track 54 is obtained the width of which may be read as such or rendered more readily visible by dusting the inked disc with zinc oxide white or lamp black depending on the color of the film. The width of the track is readily measured by means of a microscope having a scale in the eye piece. This reading is easily converted into a hardness rating by substitution in the above formula.

For very slowly drying materials, the time interval may be increased by delaying the application of the sand to the disc or of the indentation ball to the paint film until a considerable time interval after the film has been spun. However, for nitrocellulose lacquer films, continuous hardness measurements can be made with the rolling ball method fifteen minutes after the film has been spun. In the case of these lacquers the discs are rotated preferably once every hour whereas one rotation per four hour interval is preferable in the case of slow drying oil films.

It is to be understood that the examples given herein are merely illustrative and not limitative embodiments of the invention, for the indenting element may be an oblate spheroid, a rounded or otherwise shaped element, and hence the scope of the application is to be determined solely by the appended claims.

I claim:

1. The method of measuring the drying and hardening properties of a paint film which comprises coating a disc with a paint film, rotating the disc in contact with a weighted, inked ball whereby an imprint of the ball is made on the paint film, measuring the width of the imprint and determining the hardness of the film therefrom.

2. The method of measuring the drying and hardening properties of a paint film which comprises coating a disc with a paint film, rotating the disc in contact with a weighted, inked ball whereby an imprint of the ball is made on the paint film, measuring the width of the imprint and applying to that measurement the formula:

$$H = \frac{L}{W^2} \times 10^{-2}$$

where H=hardness, L=weight in grams, W=width of imprint in millimeters; and calculating the hardness of the film therefrom.

3. The method of measuring the hardening properties of a coating material which comprises coating a disc with a film by spinning a layer of the material on a rapidly rotating disc, allowing the film to set to touch, causing a weighted, inked ball to print a continuous permanent record on the film while the disc is rotating at a fixed speed, and calculating the hardness of the film from the width of the imprinted record.

4. Apparatus for determining the hardening properties of a paint film comprising a disc having a paint film thereon, means for rotating the disc at a predetermined rate, a weighted recording ball having an inked surface contacting the paint film, and means for moving the recording element across the disc on a diameter thereof so as to obtain a continuous printed record of the depth of penetration of the ball and means for renewing the inked surface removed from the recording ball by the moving paint film.

5. Apparatus for determining the hardening properties of a paint film comprising a disc having a paint film thereon, means for rotating the disc at a predetermined rate, a weighted inked ball contacting the paint film, means for rotatably supporting said ball, means for moving the ball across the disc on a diameter thereof so as to obtain a continuous printing record of the depth of penetration of the ball, and an inking roller disposed above and contacting the ball, the axis of rotation of the inking roller being inclined to the axis of rotation of the ball whereby rotation of the latter across the surface of the disc causes a freshly inked portion of the inking roller to contact the ball.

LADISLAV BOOR.